United States Patent Office 3,314,756
Patented Apr. 18, 1967

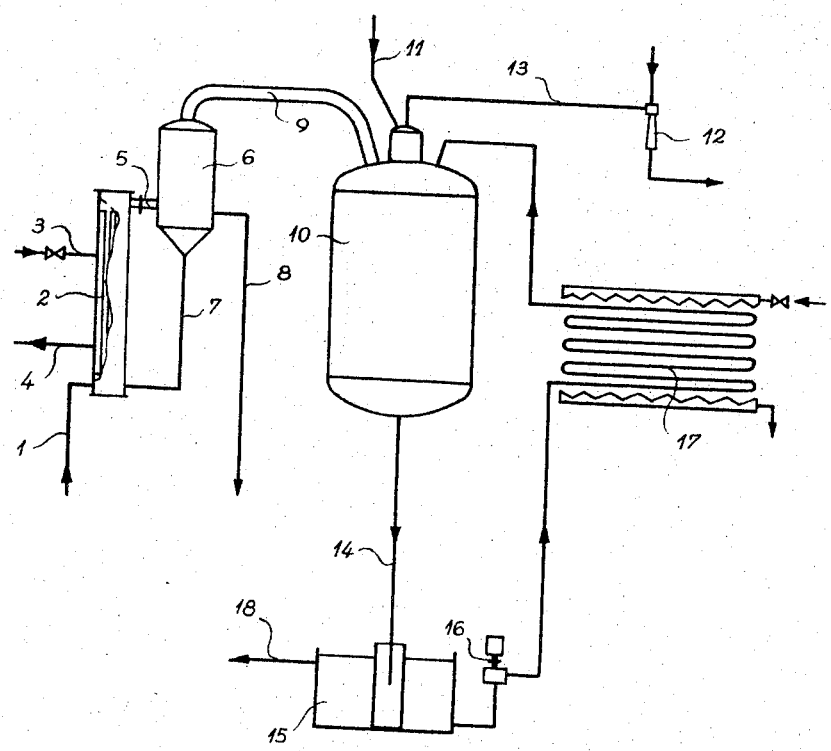

3,314,756
METHODS OF PREPARING HIGH-CONCENTRATION PHOSPHORIC ACID
René Myon, Lille, Nord, France, assignor to Appareils et Evaporateurs Kestner, Lille, Nord, France, a French corporation
Filed Mar. 4, 1963, Ser. No. 262,419
Claims priority, application France, Jan. 7, 1963, 920,673, Patent 1,352,925
3 Claims. (Cl. 23—165)

It is known, in the manufacture of phosphoric acid through the wet process wherein the phosphate is attacked by the sulfuric acid, to obtain as a rule, from the filters, solutions assaying from 28% to 30% of phosphorous pentoxide, $P_2O_5$.

After decanting these solutions are concentrated to a $P_2O_5$ content of 48% to 50% corresponding to the concentration of an ordinary commercial solution.

In order to reduce transport cost, attempts have recently been made with a view to further increase the concentration up to a 72% $P_2O_5$ concentration corresponding to a 100% orthophosphoric acid concentration, this acid being currently referred to as "superphosphoric acid." Actually, this acid is a mixture of orthophosphoric and pyrophosphoric acids.

The preparation of this high-concentration acid is attended by several difficulties owing to the very high boiling temperature to be attained. In fact, it was ascertained that under atmospheric pressure the acid undergoing the concentration process has the following boiling temperatures, as a function of the content of $P_2O_5$:

| $P_2O_5$, percent | Concentration of the corresponding $H_4PO_3$ (percent) | Boiling temperature under atmospheric pressure | |
|---|---|---|---|
| | | ° C. | ° F. |
| 54.32 | 75 | 135 | 275 |
| 61.57 | 85 | 158 | 316 |
| 72.43 | 100 | 262 | 504 |

Up to now the very high boiling temperature necessary for producing acid having a 100% orthophosphoric acid content was obtained by using high-temperature gas direct-heating methods, consisting essentially in producing a generator hot gases at 800°–900° C. or more, these gases being put in direct contact with the acid to be concentrated in a column, or in an immersed burner, or any other known and suitable device.

These methods suffer from a very serious drawback because they release in the free atmosphere very large volumes of fumes loaded with acid particles since they were in direct contact with the acid. On the other hand, at a 100% orthophosphoric acid concentration and very high temperatures, the acid tends to release white vapours which cannot be collected completely, under practical conditions.

Of course, the temperatures involved can be reduced considerably by using a vacuum concentration process, but in this case heat transfer surfaces must be provided and on the other hand the concentration must be carried out under a very high vacuum corresponding to an absolute pressure of the order of a few millimeters of Hg, for the boiling temperature remains relatively high.

The following table shows the vapour tension of phosphoric acid having a 100% orthophosphoric acid content at different temperatures:

| Temperature: | | | | | |
|---|---|---|---|---|---|
| ° C. | 102 | 107 | 117 | 122 | 140 |
| ° F. | 216 | 225 | 241 | 253 | 284 |
| Vapor tension in mm./Hg | 4 | 5 | 8 | 10 | 20 |

It is clear that if it is desired to limit these temperatures to about 110–125° C. (230°–255° F.), as consistent with known construction materials, the evaporation must be carried out under an absolute vacuum of 5 to 10 mm. of Hg.

Now it is well known that in commercial practice the working of such high-vacuum process is extremely costly due to the fact that the condensation temperature of the evaporation vapor emitted under such low absolute pressures is very moderate, as shown by the following table:

| Absolute pressure in mm./Hg | 4 | 5 | 8 | 10 |
|---|---|---|---|---|
| Water vapor condensation temperature in— | | | | |
| ° C. | −2 | +1 | +8 | +11 |
| ° F. | 28.4 | 33.8 | 46.4 | 51.8 |

Obviously, condensing a vapor at such low temperature requires the use of very costly devices such as refrigerating machines or ejectors adapted to recompress the vapor at a pressure such that it can be condensed in an ordinary apparatus such as a water condenser or the like.

With the phosphoric acid concentration method of this invention it is possible to avoid these drawbacks and to attain a 72% $P_2O_5$ content corresponding to a 100% orthophosphoric acid concentration. This method is characterized in that the concentration step is carried out under a high vacuum of the order of a few millimeters Hg absolute pressure, in an evaporator consisting of a surface heat transfer apparatus, while the evaporation water vapor is collected by condensation in the sulfuric acid, and the steam condensation heat is dissipated by cooling the sulfuric acid.

The absolute pressure will be preferably of the order of 5 to 10 mm. Hg.

The emitted evaporation vapor is condensed in a condenser supplied with sulfuric acid. The resulting diluted sulfuric acid may be used to advantage in the preparation of low-concentration phosphoric acid to be subsequently reconcentrated.

A typical example of the manner in which the method of this invention may be carried out in practice will now be described with reference to the accompanying drawing. The single figure of this drawing illustrates diagrammatically an apparatus forming likewise part of this invention and suitable for carrying out the method set forth hereinabove.

The acid having a $P_2O_5$ content of about 50% is introduced through a pipe 1 into an evaporator 2 of the tubular nest type, which is heated with live steam supplied through a pipe 3, the condensate being discharged through a duct 4. The evaporation is carried out under a high vacuum of the order of a few mm. Hg. The vapor is transferred through a duct 5 to a separator 6 in which it is separated from the acid. A portion of the acid is returned to the evaporator 2 through a duct 7 connecting the bottom of the separator to the input chamber of the evaporator, the acid at the desired concentration value being discharged through another duct 8. The evaporation vapor collected in the upper part of separator 6 is introduced through a duct 9 into a mixer-type condenser 10 which constitutes a liquid-gas contact zone in which a sulfuric acid circulation is maintained. Fresh concentrated sulfuric acid (preferably at a specific gravity of about 66° Bé.) is fed continuously to the condenser 10 through a feed pipe 11. The extraction of the non-condensable gases, and the creation of a high vacuum, is obtained with the assistance of a vacuum pump or like device 12 having its suction port connected to the upper part of the condenser through a line 13. The condenser 10 may be of any suitable type, its essential function consisting in producing an intimate contact between the sulfuric acid and the steam. Thus, for example, a bubbling column or a shower column of the washer type may be used for this purpose.

The sulfuric acid circulation is effected through a circuit comprising a substantially vertical pipe 14 extending from the bottom of the condenser and having its lower open end immersed in a vessel 15 from which the acid taken by a pump 16 is forced through a cooler 17 of known type into the upper portion of condenser 10. The height of pipe 14 is sufficient to cause the pressure exerted by the liquid column in this pipe to counterbalance the atmospheric pressure, due account being taken of the negative pressure existing in the condenser.

Due to the absorption of water vapor, the sulfuric acid is diluted and heated, and the thus collected heat resulting from the dilution of the sulfuric acid is dissipated in the cooler 17.

The excess diluted sulfuric acid is discharged from the circuit through an overflow pipe 18 provided on the vessel 15 and is subsequently delivered to the means for preparing phosphoric acid or to other manufacturing means designed for using a diluted acid having a $H_2SO_4$ concentration of about 70 to 75%.

It is evident that for discharging the concentrated phosphoric acid through the pipe 8 some conventional means such as a vessel (not shown) similar to vessel 15 which is associated with pipe 14 must be provided with a view to maintain the vacuum in the apparatus.

It may be noted that whereas the direct condensation of evaporation vapors due to their very low temperature was not possible, the heat corresponding to their condensation is found again in the sulfuric acid at a considerably higher potential and its elimination becomes very easy in the cooler 17.

By way of example and assuming that the sulfuric acid is diluted at a concentration of 78% of $H_2SO_4$, the vapor pressure of this acid is given by the following table:

| Temperature: | | | | |
|---|---|---|---|---|
| °C | 65 | 68 | 77 | 83 |
| °F | 149 | 154.4 | 170.6 | 181.4 |
| Pressure, mm./Hg | 4 | 5 | 8 | 10 |

If a vacuum value corresponding to an absolute pressure of 5 mm./Hg is used, it will be seen that with this method the concentration and the preparation of phosphoric acid containing 100% orthophosphoric acid can be effected without overstepping a temperature of 107° C. (225° F.), and that the evaporation vapor emitted at a condensation temperature of +1° C. (33.8° F.) will be condensed in the sulfuric acid at a 78% concentration and a temperature of 65° C. (149° F.).

It is clear that under these conditions the condensation heat can be removed without difficulty, since in this case the heat is to be eliminated from a fluid (diluted sulfuric acid) at a temperature of 65° C. (149° F.).

This cooling action may be obtained for example by means of a water circulation.

It should also be noted that the quantity of concentrated sulfuric acid for example at 66° Baumé (which corresponds to a specific gravity of about 1.842) used in the commercial production of phosphoric acid corresponds to the quantity of acid necessary for absorbing the evaporation vapor of the phosphoric acid having a 50% $P_2O_5$ content, converted into 72% acid. In fact, as a rule 2,700 kilograms (5,950 lbs.) of 95% $H_2SO_4$ sulfuric acid are required for obtaining 1,000 kilograms (2,200 lbs.) of $P_2O_5$ in the form of diluted acid.

The quantity of vapor to be absorbed while increasing the $P_2O_5$ concentration from 50% to 72% (100% of $PO_4H_3$) is $$\frac{1,000}{.5} - \frac{1,000}{.72}$$

=610 kilograms (1,540 lbs.) per 1,000 kilograms (2,200 lbs.) of $P_2O_5$ corresponding to the dilution of the useful sulfuric acid:

$$\frac{2,700}{\frac{2,700}{.95}+610} \times 100 = 78\% \ H_2SO_4$$

It will be seen that under these conditions very large quantities of sulfuric acid are available for absorbing the steam. On the other hand it may be emphasized that in the commercial manufacture of phosphoric acid it is customary to dilute the sulfuric acid to about 70% to 75% $H_2SO_4$ before use; therefore, the acid dilution effected according to the teachings of the method of this invention will not interfere whatsoever with the manufacture proper since this dilution is in any case necessary.

All percents in the specification and claims are weight percents.

What is claimed is:

1. A process for producing concentrated phosphoric acid comprising the steps of introducing phosphoric acid containing about 50 weight percent $P_2O_5$ into an evaporation zone maintained under a vacuum of about 5–10 mm. Hg, heating the phosphoric acid within the evaporation zone by indirect heat exchange with a hot fluid medium to form a mixture of steam and concentrated phosphoric acid, separating the steam from said concentrated phosphoric acid, passing the concentrated phosphoric acid from the system, introducing the separated steam into a liquid-gas contact zone maintained under a vacuum of about 5–10 mm. Hg, introducing both concentrated sulphuric acid and dilute sulphuric acid into said contact zone to absorb the steam by direct contact to dilute and heat the sulphuric acid within said contact zone, separating the sulphuric acid diluted within said contact zone into two streams, cooling a first stream of the separated sulphuric acid in a zone remote from said evaporation zone, recycling the cooled first stream to form the dilute sulphuric acid introduced into said contact zone, and removing said second stream of separated sulphuric acid from the system.

2. A process for producing concentrated phosphoric acid containing about 72 weight percent $P_2O_5$, comprising the steps of introducing phosphoric acid containing about 50 weight percent $P_2O_5$ into an evaporation zone maintained under a vacuum of about 5–10 mm. Hg, maintaining the temperature of the phosphoric acid within said evaporation zone between about 107° C. and 125° C., heating the phosphoric acid within said evaporation zone by indirect heat exchange with a hot fluid medium to form a mixture of steam and concentrated phosphoric acid containing about 72% $P_2O_5$, separating the steam from said concentrated phosphoric acid, removing the concentrated phosphoric acid from the system, introducing the separated steam into a liquid-gas contact zone maintained under a vacuum of about 5–10 mm. Hg, introducing into said contact zone concentrated sulphuric acid of a density of about 66° Baumé, introducing dilute sulphuric acid into said contact zone, absorbing the steam in the sulphuric acid within said contact zone by direct contact to dilute and heat the sulphuric acid within said contact zone, separating the diluted sulphuric acid of said contact zone into two streams, passing a first stream of said diluted sulphuric acid to a cooling zone remote from said evaporation zone, recycling the cooled first stream to form the dilute sulphuric acid introduced into said contact zone, and removing said second stream of diluted sulphuric acid from the system.

3. A process for producing concentrated phosphoric acid containing about 72 weight percent $P_2O_5$, comprising the steps of introducing phosphoric acid containing about 50 weight percent $P_2O_5$ into an evaporation zone maintained under a vacuum of about 5–10 mm. Hg, maintaining the temperature of the phosphoric acid within said evaporation zone between about 107° C. and 125° C., heating the phosphoric acid within said evaporation zone by indirect heat exchange with a hot fluid medium to form a mixture of steam and concentrated phosphoric acid containing about 72% $P_2O_5$, separating the steam from said concentrated phosphoric acid, removing the concentrated phosphoric acid from the system, introducing the separated steam into a liquid-gas contact zone maintained under a vacuum of about 5–10 mm. Hg, introducing into said contact zone concentrated sulphuric acid of a density of about 66° Baumé, introducing dilute sulphuric acid into said contact zone, absorbing the steam in the sulphuric acid within said contact zone by direct contact to dilute the sulphuric acid to about 70–75 weight percent $H_2SO_4$ and heat the sulphuric acid within said contact zone, separating the diluted sulphuric acid of said contact zone into two streams, passing a first stream of said diluted sulphuric acid to a cooling zone remote from said evaporation zone, recycling the cooled first stream to form the dilute sulphuric acid introduced into said contact zone, and removing said second stream of diluted sulphuric acid from the system.

References Cited by the Examiner

UNITED STATES PATENTS

| | | | |
|---|---|---|---|
| 393,428 | 11/1888 | Giles et al. | 23—165 |
| 2,368,588 | 1/1945 | Worthen et al. | 159—17 |
| 2,611,681 | 9/1952 | Bellinger et al. | 23—165 |
| 2,741,584 | 4/1956 | Holmes et al. | 202—64 |
| 2,749,291 | 6/1956 | Pierotti et al. | 202—39 |
| 2,807,521 | 9/1957 | Lambe et al. | 23—165 |
| 2,818,372 | 12/1957 | Hood et al. | 202—57 |
| 2,865,920 | 12/1958 | Stark | 159—17 |
| 2,905,535 | 9/1959 | Atkin et al. | 23—165 |
| 2,990,341 | 6/1961 | Graybill | 202—46 |
| 3,073,677 | 1/1963 | Malley et al. | 23—165 |

OSCAR R. VERTIZ, *Primary Examiner.*

MAURICE A. BRINDISI, *Examiner.*

O. F. CRUTCHFIELD, *Assistant Examiner.*